United States Patent
Llano

(10) Patent No.: US 8,993,083 B1
(45) Date of Patent: Mar. 31, 2015

(54) SELF ADHERING FABRIC PATCH

(71) Applicant: Source One Tactical, Inc., Wellington, FL (US)

(72) Inventor: Mark Llano, Wellington, FL (US)

(73) Assignee: Source One Tactical, Inc., Wellington, FL (US)

( * ) Notice: Subject to any disclaimer, the term of this patent is extended or adjusted under 35 U.S.C. 154(b) by 0 days.

(21) Appl. No.: 14/281,376

(22) Filed: May 19, 2014

Related U.S. Application Data

(63) Continuation-in-part of application No. 12/074,623, filed on Mar. 4, 2008, now Pat. No. 8,765,245.

(51) Int. Cl.
| | |
|---|---|
| G09F 3/10 | (2006.01) |
| C09J 7/02 | (2006.01) |
| B32B 7/06 | (2006.01) |
| B32B 7/12 | (2006.01) |
| A41H 27/00 | (2006.01) |

(52) U.S. Cl.
CPC ..................................... *A41H 27/00* (2013.01)
USPC ........... 428/40.1; 428/343; 428/354; 428/355

(58) Field of Classification Search
USPC .................. 428/343, 40.1, 354, 355
See application file for complete search history.

(56) References Cited

U.S. PATENT DOCUMENTS

| | | | |
|---|---|---|---|
| 1,765,098 A | 6/1930 | Roozendaal | |
| 3,772,114 A | 11/1973 | Kowalchuk | |
| 4,047,994 A | 9/1977 | Komatsu | |
| 4,061,826 A * | 12/1977 | Petras et al. | 428/356 |
| 4,086,113 A | 4/1978 | Cataffo et al. | |
| 4,715,914 A * | 12/1987 | Viner | 156/94 |
| 4,759,812 A | 7/1988 | Miller | |
| 5,145,541 A | 9/1992 | Baron et al. | |
| 5,771,496 A | 6/1998 | Wood | |
| 5,916,391 A | 6/1999 | Riedel et al. | |
| 5,958,526 A * | 9/1999 | Spickelmire | 428/17 |
| 6,022,914 A * | 2/2000 | Nowak et al. | 524/101 |
| 2001/0020537 A1 | 9/2001 | Ueno et al. | |
| 2003/0044563 A1 | 3/2003 | Kocinec et al. | |
| 2004/0096491 A1 | 5/2004 | Tateishi et al. | |
| 2005/0136266 A1 | 6/2005 | Zhou et al. | |
| 2005/0192392 A1 | 9/2005 | Kim et al. | |
| 2005/0271862 A1 | 12/2005 | Lapierre | |

OTHER PUBLICATIONS http://web.archive.org/web/20071231054401/http://www.alluniforms.com/fabguid.htm (accessed May 19, 2014).

* cited by examiner

*Primary Examiner* — Samir Shah
(74) *Attorney, Agent, or Firm* — Holland & Knight LLP; Brian J. Colandreo, Esq.; Jeffrey T. Placker, Esq.

(57) ABSTRACT

A flame retardant patch may include a sheet of fabric having a top side and a bottom side, wherein the sheet of fabric is flame resistant. The flame retardant patch may further include a flame retardant pressure sensitive adhesive bonded to the bottom side of the sheet of fabric.

8 Claims, 2 Drawing Sheets

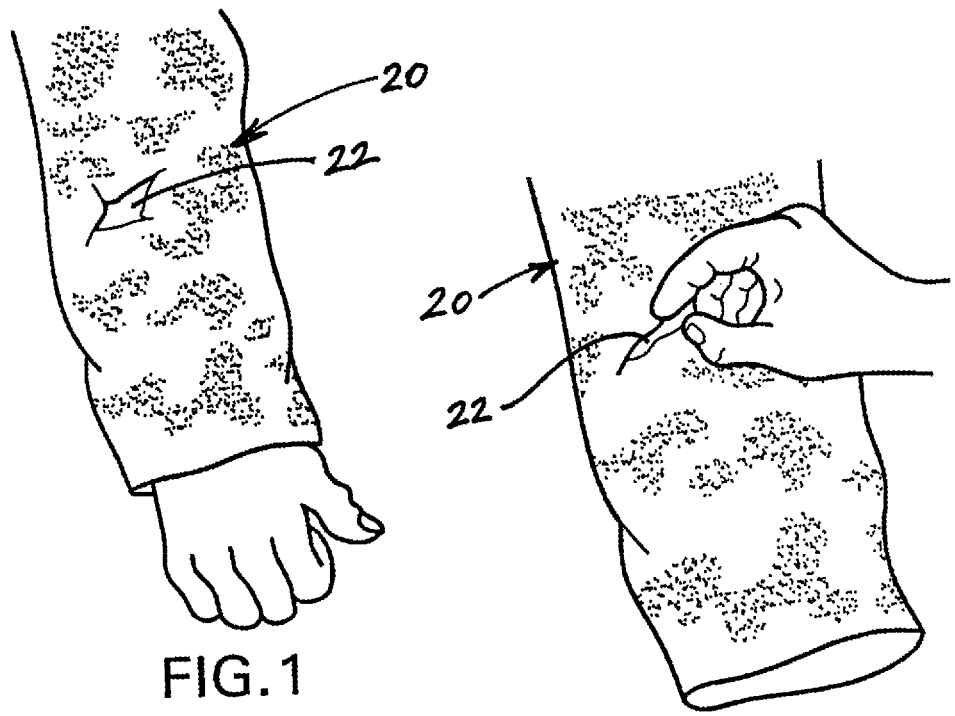
FIG. 1
FIG. 2
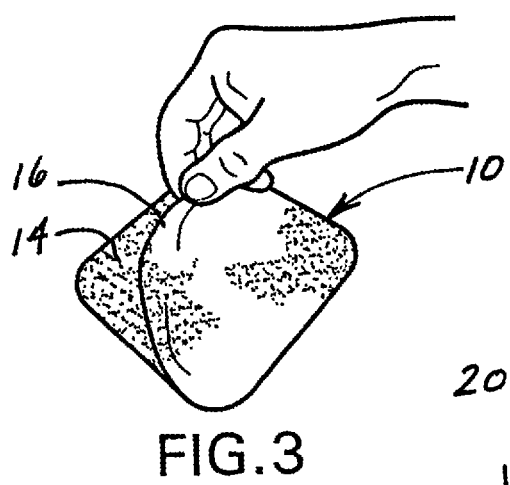
FIG. 3
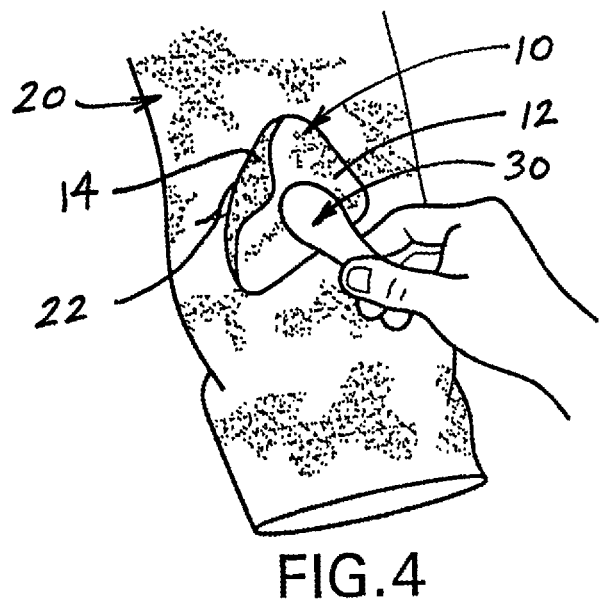
FIG. 4

SELF ADHERING FABRIC PATCH

CROSS-REFERENCE TO RELATED APPLICATION

This application is a continuation-in-part of U.S. patent application Ser. No. 12/074,623 filed Mar. 4, 2008, entitled "Self Adhering Fabric Patch", the contents of which are incorporated by reference in its entirety.

TECHNICAL FIELD

The present disclosure is directed to a self-adhering fabric patch for repairing clothing and gear, and more particularly, to a self-adhering flame retardant patch for repairing tears or openings in clothing and gear.

BACKGROUND

Flame resistant materials are commonly used in the manufacture of military uniforms, and particularly combat uniforms, as well as firefighter gear, driving suits and gloves for race car drivers and astronaut suits. A small hole or tear in the fire resistant fabric can compromise the burn protection property of the garment and expose the wearer to serious injury. In the event a direct flame finds its way through a hole or tear in the fire resistant garment, the wearer's undergarments can ignite and cause severe burns and possible fatal injury. Accordingly, it is important to repair all tears and openings in fire protective garments in a manner that completely closes these openings to restore the flame resistant integrity of the garment.

SUMMARY OF THE DISCLOSURE

According to an implementation, a flame retardant patch may include a sheet of fabric having a top side and a bottom side, wherein the sheet of fabric is flame resistant. The flame retardant patch may further include a flame retardant pressure sensitive adhesive bonded to the bottom side of the sheet of fabric. The flame retardant pressure sensitive adhesive may include one or more halogenated flame retardant compounds in the range of 22% and 28% of the flame retardant pressure sensitive adhesive. The flame retardant pressure sensitive adhesive may further include an acrylic pressure sensitive adhesive in the range of 14% to 18% of the flame retardant pressure sensitive adhesive. The flame retardant pressure sensitive adhesive may also include a rosin in the range of 1% to 2% of the flame retardant pressure sensitive adhesive. The flame retardant pressure sensitive adhesive may further include a silicone coated, polyethylene coated paper in the range of 37% to 43% of the flame retardant pressure sensitive adhesive, wherein the silicone coated, polyethylene coated paper is coated on both sides of the paper.

One or more of the following features may be included.

The top side of the sheet of fabric may match an outer surface of an article of clothing. The top side of the sheet of fabric may be printed with a color pattern to match the color pattern of an article of clothing. The top side of the sheet of fabric may also be printed with a camouflage pattern to match the camouflage pattern of an article of clothing.

At least a portion of the sheet of fabric of the flame retardant patch may include aromatic polyamide fibers. At least a portion of the sheet of fabric of the flame retardant patch may further include a blend of fibers.

The sheet of fabric may provide a spectral reflectance conforming to performance specifications of MIL-DTL-44436.

The flame retardant pressure sensitive adhesive may be laminated to the bottom side of the sheet of fabric via hot melt lamination.

The details of one or more implementations are set forth in the accompanying drawings and the description below. Other features and advantages will become apparent from the description, the drawings, and the claims.

BRIEF DESCRIPTION OF THE DRAWINGS

For a fuller understanding of the nature of the present disclosure, reference should be made to the following detailed description taken in conjunction with the accompanying drawings in which:

FIG. 1 is an isolated view of a sleeve of a camouflage uniform on the arm of a soldier, shown with a tear in the material of the uniform;

FIG. 2 is an isolated perspective view demonstrating the manner of repairing the tear shown in FIG. 1, by first closing the tear using the fingers;

FIG. 3 is a perspective view showing the uniform repair patch of the present disclosure, and particularly a protective backing paper being peeled away from a pressure sensitive adhesive layer of the patch;

FIG. 4 is an isolated perspective view showing application of the repair patch to the sleeve of the soldier uniform by placing the pressure sensitive adhesive side of the patch over the area surrounding the tear and using the concave side of a spoon-like object to apply pressure to the outer surface of the patch, thereby causing the patch to adhere to the surface of the sleeve of the uniform while covering the tear.

Like reference numerals refer to like parts throughout the several views of the drawings.

DETAILED DESCRIPTION

Figure 5:
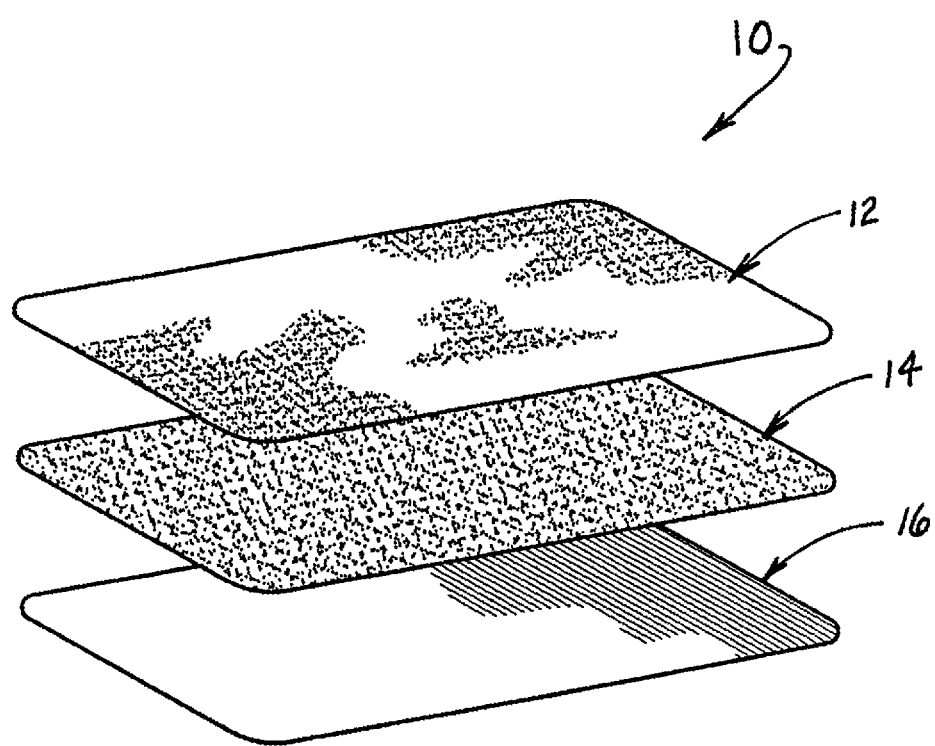
FIG. 5 is an exploded perspective view showing the structural layers of the repair patch of the present disclosure.

Referring initially to FIG. 5, a preferred embodiment of the repair patch of the present disclosure is shown and is generally indicated as repair patch 10. Repair patch 10 may include fabric layer 12, pressure sensitive adhesive 14 that may be laminated to the bottom side of fabric layer 12 by hot melt lamination, and paper release liner 16 (i.e., backing) for protectively covering the pressure sensitive adhesive prior to application. Patch 10 may be die cut to the desired size and provided with radiused corners. Patch 10 may be provided in a range of sizes and may be generally square or rectangular in shape, although other shapes (e.g., round) may be used as well. Patch 10 may be packaged in different sizes (e.g., a total of 8 patches) in a clear plastic bag/envelope with application instructions.

In an embodiment, top fabric layer 12 of patch 10 may be flame resistant and made with aromatic polyamide fibers. The repair patch of the present disclosure may use NOMEX® IIIa fabric available from Southern Mills, Inc. of Union City, Ga. NOMEX® is a registered trademark of DuPont. The NOMEX® IIIa material may be digitally printed with a camouflage pattern to match (e.g., which may include being identical to, substantially the same as, generally similar to, and/or including a common visual and/or textural feature, characteristic or impact) the camouflage pattern of the soldier uniform and meets or exceeds the flame retardant and NIR (near infra red) compliant standards of the soldier uniform material.

In an embodiment, top fabric layer 12 of patch 10 may include TenCate Defender™ M protective fibers. TenCate Defender™ M protective fibers and/or fabrics may generally include a proprietary blend of fibers which provides intrinsic flame resistant qualities. Top fabric layer 12 may be woven into a plain weave with ripstop and twill construction in a range of weights. Fabric yarn may include a blend of fibers including, but not limited to, flame resistant rayon, aramid, and nylon. Fabric patch 10 may be printed in a variety of camouflage patterns to match (e.g., which may include being identical to, substantially the same as, generally similar to, and/or including a common visual and/or textural feature, characteristic or impact) a pattern of a given uniform.

In an embodiment, pressure sensitive adhesive 14 may include SCAPA PI 089™ available from Scapa North America of Windsor, Conn. SCAPA PI089™ is a flame retardant pressure sensitive adhesive that contains the following ingredients:

14%-18% Acrylic Pressure Sensitive Adhesive
1%-2% Rosin
22%-28% Halogenated Flame Retardant Compounds
37%-43% Silicone Coated (2-sides), Polyethylene Coated (2-sides) paper FIGS. 1-4 demonstrate the manner of attachment of patch 10 to soldier uniform 20 having tear 22 in the sleeve. As seen in FIG. 1, the tear may create a significant opening in the sleeve of the uniform that may expose the soldier to potential burn injury in the event of an explosion. FIG. 2 demonstrates the manner of repairing the tear by first lying the garment on a flat, rigid surface and bringing the torn edges of the fabric together, to thereby close the opening in the sleeve. Any excess frayed materials along the torn edges should be trimmed away. The area of application should be free of dirt, sand, oil and other debris. It is preferable that the garment be laundered first, before patch application. Next, in FIG. 3, patch 10 may be prepared for attachment by first removing the peel-away backing paper to expose the pressure sensitive adhesive. Next, as seen in FIG. 4, patch 10 may be placed over the tear, while maintaining the torn edges pulled together, and with the pressure sensitive adhesive applied directly to the outer surface of the uniform material surrounding the tear. Once positioned over the tear, patch 10 may be pressed firmly with the fingers to smooth out wrinkles, creases or air pockets to ensure full adhesion. A spoon-like object 30 may then be rubbed on the outer fabric surface of patch 10 in a reciprocating motion across the entire surface of patch 10 while applying pressure. The reciprocating motion and pressure exerted by the concave surface of the spoon-like object 30 against patch 10 may push the adhesive into the fabric of the garment and generate heat and pressure to cause pressure sensitive adhesive 14 to fully bond with the exterior fabric of the uniform. After approximately 45 seconds of rubbing with consistent pressure, patch 10 may be fully adhered to the uniform, covering and maintaining the tear closed.

In order to determine the longevity of the patch, through numerous laundering cycles, the following experiment was performed:

WASH TEST
SCOPE

This experiment was designed to evaluate the behavior of the repair patch on soldier uniforms when subjected to washing conditions through repeated laundering cycles.

Preparation of Samples

ACU coat and pants made out of NYCO™ material were purchased from an Army surplus store. Three inch by three inch repair patches with rounded corners (one inch radius) were used. First, the release liner was removed from the patches in order to expose the pressure sensitive adhesive. Two patches were applied on the back of the coat and one patch was applied to the elbow on the sleeve. Additionally, two patches were applied to one leg of the pant near the knee area. During application of the patches, each patch was rubbed with the back of a spoon while applying pressure and friction for approximately 45 seconds as the temperature of the patch steadily increased. This action was performed on a wooden table top.

Procedure

1. Water temperature was measured at the source (hot water faucet) with a Taylor digital thermometer, recording a reading of 130 degrees F.
2. Both samples were placed in the washing machine (Whirlpool Cabrio AGI). Arm and Hammer liquid laundry detergent was used.
3. Five fluid ounces of laundry detergent was added. Wash cycle was started with the machine settings at normal, light soil level, and hot/cold wash and rinse temperature.
4. Once the water filling phase was completed, the cycle was paused and the water temperature was read inside the washing machine, with an observed reading of 116 degrees F.
5. Once the washing program ended, the samples were removed and observed.
6. Following the observations, samples were deposited in a clothes dryer at medium heat and an automatic time cycle.
7. The drying cycle stopped when the dryer automatically sensed the samples were dry.
8. At the end of the drying cycle, the samples were removed and allowed to cool for two minutes.

Observations

The samples were subjected to 10 (ten) complete laundry cycles (i.e., washing and drying), after which the repair patches showed negligible separation not exceeding in any case the maximum of ⅛ of an inch around the perimeter edges of the repair patches.

In an embodiment, patch 10 may conform to the following specifications:

Flame Retardant Performance:

The flame propagation of the patch when applied to the base substrate may be equal to or less than that of the original substrate. The material may be tested in accordance with ASTM D 6413.

Spectral Reflectance:

The spectral reflectance of the patch may conform to the performance specification as stated in MIL-DTL-44436 for each pattern/style of patch: Universal Camouflage, Woodland, and Desert Patterns.

Pattern Execution:

The pattern of the finished Universal Camouflage pattern patch may reproduce the standard sample with respect to design, color, and registration of the respective areas. The pattern of the patch may match, substantially match, or similarly match, the pattern on the specified drawing for the Universal Camouflage, 2-1-1516, 2-1-2240, and 2-1-2519.

Shade Execution:

The shade of each individual color may match the colors outlined in MIL-DTL-44436.

Matching:

The color of the webbing may match the Universal camouflage ACU standard sample (Or Woodland/Desert as applicable) when viewed under a filtered tungsten lamp which approximates artificial daylight having a correlated color temperature of 75000+/−200K, with illumination of 100+/−20 foot candles, and may be a good match to the standard sample under incandescent lamplight at 2300+/−200 K.

Adherence to Substrate:

The patch may remain adhered to the base substrate, on all sides (both outer and inner patches) with less than a ⅛ inch of delamination from the base substrate on all 4 sides of the patch material.

Laundering:

The patch may remain adhered to the substrate as stated above after 10 home laundering washing cycles.

Physical Performance:

The finished patch material may conform to all applicable physical testing performance requirements as stated in MIL-DTL-44436, to include abrasion, weight, colorfastness, lightfastness and cracking The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A flame retardant patch comprising:
   a sheet of fabric having a top side and a bottom side, wherein the sheet of fabric is flame resistant; and
   a flame retardant pressure sensitive adhesive bonded to the bottom side of the sheet of fabric, the flame retardant pressure sensitive adhesive including:
      one or more halogenated flame retardant compounds in the range of 22% and 28% of the flame retardant pressure sensitive adhesive;
      an acrylic pressure sensitive adhesive in the range of 14% to 18% of the flame retardant pressure sensitive adhesive;
      a rosin in the range of 1% to 2% of the flame retardant pressure sensitive adhesive; and
      a silicone coated, polyethylene coated paper in the range of 37% to 43% of the flame retardant pressure sensitive adhesive, wherein the paper is coated on both sides of the paper with the silicone and the polyethylene.

2. The flame retardant patch of claim 1 wherein the top side of the sheet of fabric matches an outer surface of an article of clothing.

3. The flame retardant patch of claim 1 wherein the top side of the sheet of fabric is printed with a color pattern to match the color pattern of an article of clothing.

4. The flame retardant patch of claim 1 wherein the top side of the sheet of fabric is printed with a camouflage pattern to match the camouflage pattern of an article of clothing.

5. The flame retardant patch of claim 1 wherein at least a portion of the sheet of fabric includes aromatic polyamide fibers.

6. The flame retardant patch of claim 1 wherein at least a portion of the sheet of fabric includes a blend of fibers.

7. The flame retardant patch of claim 1 wherein the sheet of fabric provides a spectral reflectance conforming to performance specifications of MIL-DTL-44436.

8. The flame retardant patch of claim 1 wherein the flame retardant pressure sensitive adhesive is laminated to the bottom side of the sheet of fabric via hot melt lamination.

\* \* \* \* \*